Figure 1:
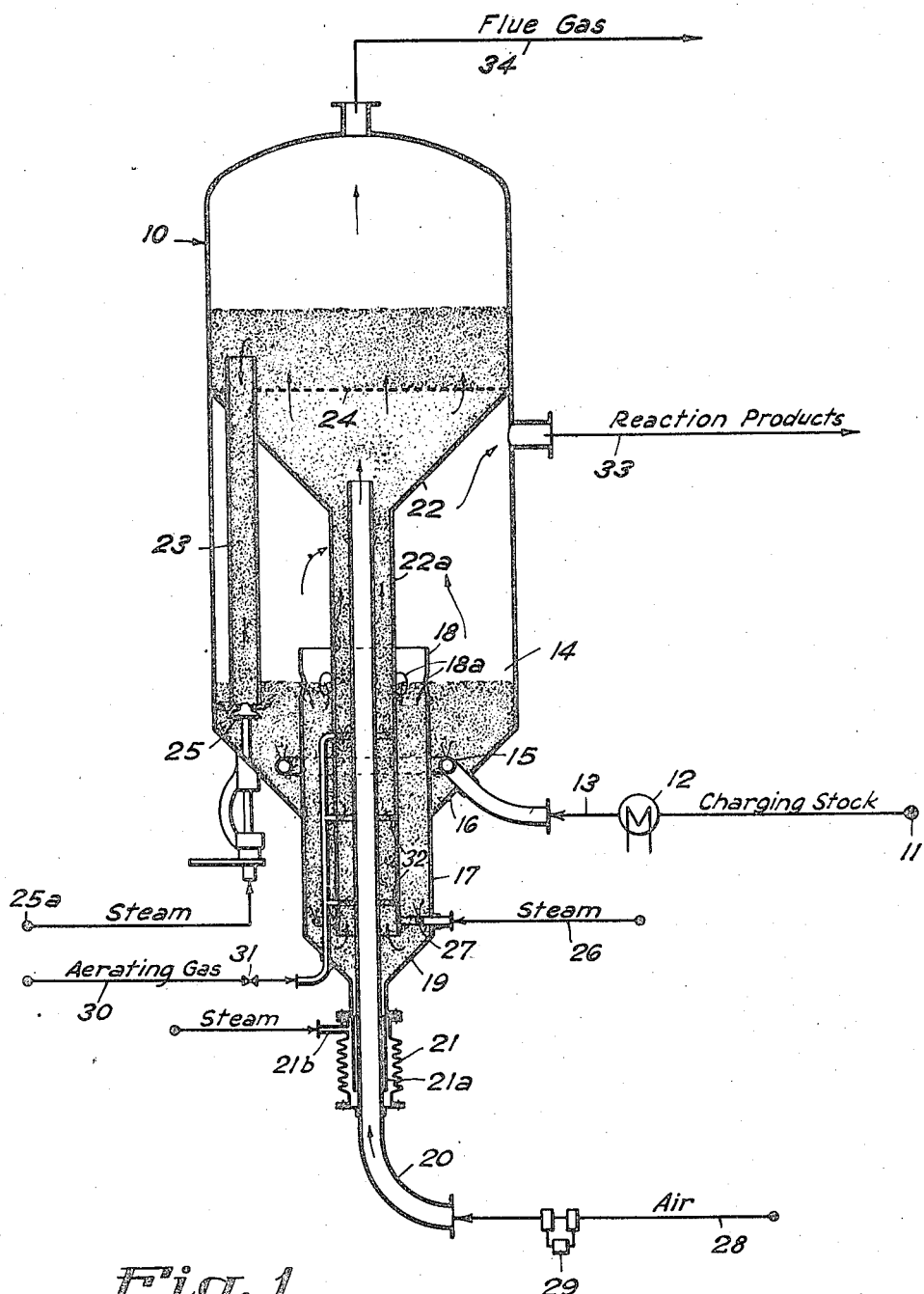

Dec. 28, 1948. R. J. HENGSTEBECK 2,457,232
CATALYTIC CONVERSION SYSTEM
Filed April 17, 1944 2 Sheets-Sheet 1

Inventor
Robert J. Hengstebeck
By Donald E. Payne
Attorney

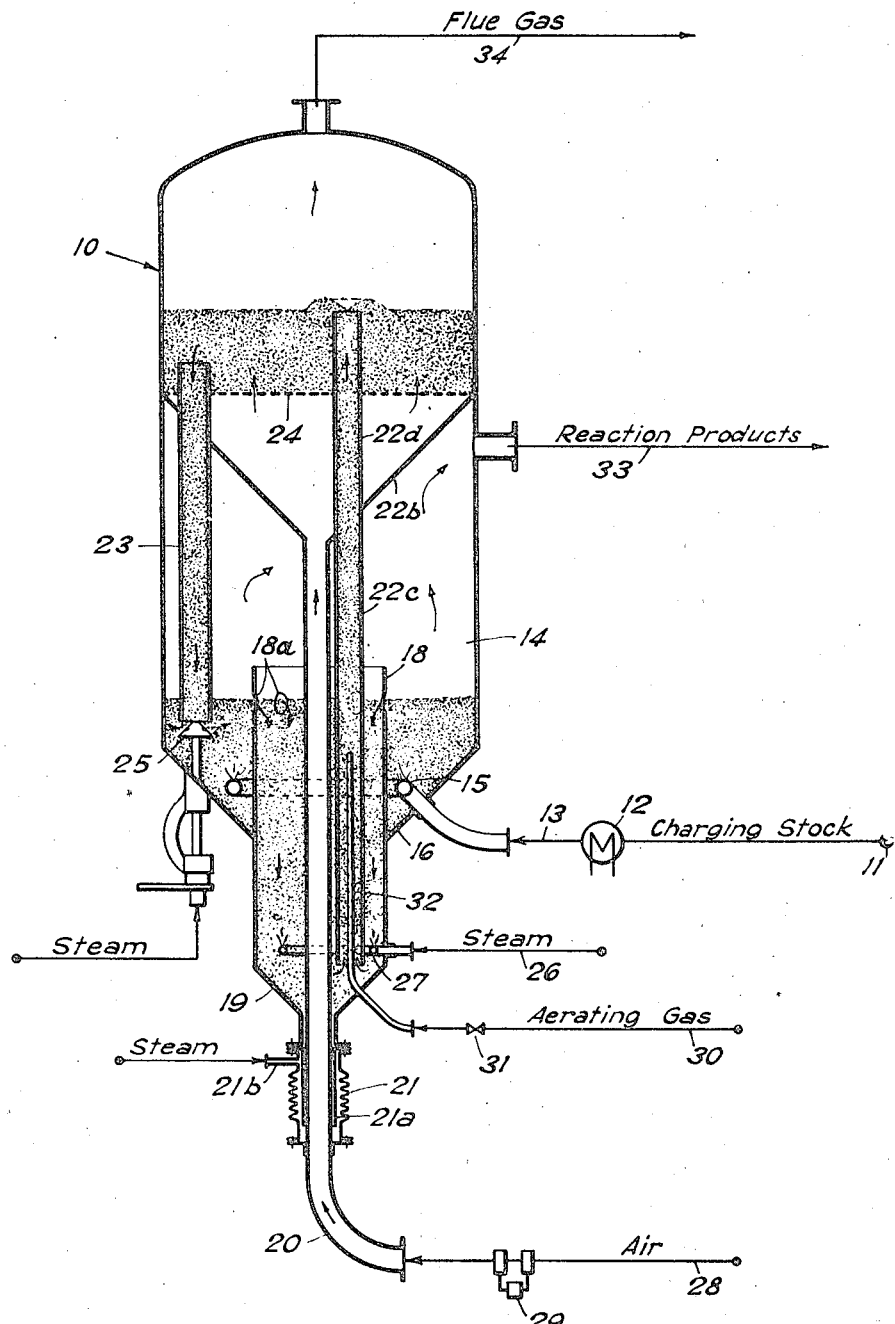

Patented Dec. 28, 1948

2,457,232

UNITED STATES PATENT OFFICE 2,457,232

CATALYTIC CONVERSION SYSTEM

Robert J. Hengstebeck, Chicago, Ill., assignor to Standard Oil Company, Chicago, Ill., a corporation of Indiana Application April 17, 1944, Serial No. 531,383

14 Claims. (Cl. 196—52)

This invention relates to a catalytic conversion system and it pertains more particularly to an improved method and means for converting hydrocarbon oils by contacting the vapors thereof with porous solid catalysts of small particle size suspended in hydrocarbon vapors, regenerating the catalyst while it is suspended in regeneration gas at a high elevation and returning the regenerated catalyst to the contacting step.

An object of the invention is to provide a unitary apparatus for effecting contact between the hydrocarbon vapors and the catalyst in one zone and effecting regeneration of the catalyst in a contiguous upper zone by oxidation with air or other oxygen-containing gases. A further object is to decrease the amount and size of equipment required for a unit of given capacity and to decrease both investment and operating costs.

A further object is to avoid the use of a catalyst valve in the system for returning stripped catalyst to the regenerator and to thereby eliminate not only serious erosion and valve sticking problems but also to eliminate the problem of providing a valve control means between relatively movable elements. A further object is to minimize the extent to which regeneration gas must be compressed for introduction into the regeneration zone.

A further object is to provide an improved reactor-regenerator structure in which the catalyst flow is effected through internal standpipes which are free from strains due to thermal expansion and contraction and in which both downflow and upflow conduits are carried or supported by a common wall between reactor and regenerator.

A further object is to regulate catalyst hold-up in the reactor and to maintain the entire system in balanced operation by controlling the densities of the catalyst in the system and particularly in a catalyst return conduit. A further object is to maintain substantially constant flow of catalyst from a low point to a high point in the system by controlling the aeration of catalyst in a conduit extending from said low point to said high point. Other objects will be apparent as the detailed description of the invention proceeds.

In catalytic cracking processes remarkable operating advantages and material savings in construction and operating costs are attainable by superimposing the regenerator above the reactor. The pressure at the top of the regenerator may be only about 1 to 3 pounds per square inch gauge and the pressure head of catalyst in the regenerator may be an additional 1 to 4 pounds which means that the air compressor need only discharge the compressed air at a pressure of the order of about 5 or 6 pounds per square inch which is much less than would be required if the regenerator were at the same level as the reactor. Standpipes leading from the dense phase in the regenerator to the dense phase in the reactor may provide an additional 6 or 8 pounds pressure head so that such standpipes can effectively serve as seals between the reactor and regenerator as well as providing the head required for catalyst flow when the reactor is operated with a top pressure of about 7 or 8 pounds per square inch so that reaction vapors may be introduced without compression to a fractionation column. This system, however, provides a problem of transferring catalyst from the base of the reaction or stripping zone back to the regenerator. Any external standpipe for dispersing spent catalyst into an incoming compressed air stream offers certain problems due to differential expansion. It has been proposed to introduce the compressed air to the regenerator through a conduit passing upwardly through the stripping and reaction zones and to simply introduce catalyst from the base of the stripping zone through a valve to said conduit. Such a valve would, however, be subject to severe erosion and it would be difficult to control because of the relative movement between the conduit and the stripping chamber wall caused by thermal expansion and contraction. In the system of my invention no catalyst valve is required at this point.

I employ a conduit leading upwardly from the base of the stripping zone to the regeneration zone or at least to an elevated level in the compressed air pipe entering the regeneration zone. The catalyst in this catalyst-return conduit serves as an effective seal between the regeneration zone and the stripping zone, it facilitates balanced operation, and it controls catalyst hold-up in the reactor. The density of the catalyst in this conduit may be controlled by varying the amount of aeration gas introduced thereto. The pressure at the base of the stripper is the sum of the pressure in the upper part of the reactor plus the static head of catalyst in the stripper. The pressure at the base of the catalyst-return conduit is the sum of the pressure in the regeneration zone (or air pipe) at the top of the conduit plus the static head of catalyst in the conduit itself. The static head in the conduit depends on the density of catalyst therein, which, as above stated, is controlled by varying the amount of aeration gas introduced thereto. With proper amounts of aeration, balanced operation is readily attainable. The rate of upward flow in any particular system should of course correspond to the rate at which catalyst is introduced into the reactor so that the catalyst hold-up in the reactor will be substantially constant. This means that there should be a substantially constant difference between the pressure head at the bottom of the conduit and the pressure head at the bottom of the stripping zone immediately adjacent thereto. By regulating the rate of aeration and thus regulating the density in this column I can obtain and maintain any desired pressure differential, control the rate of upward catalyst flow, and insure balanced operation.

In one embodiment of my invention the conduit may be an annular space surrounding the incoming air pipe and the catalyst may be dispersed in the incoming air at an intermediate or upper part of the conduit and thence passed through a suitable distributor into the regeneration zone. In another embodiment of my invention the conduit may extend into the regeneration zone at a point above the distributor and may in fact extend to an upper part of the regeneration zone. The invention will be more clearly understood from the following detailed description of these two embodiments read in conjunction with the accompanying drawings which form a part of this specification and in which:

Figure 1 is a vertical section through my reactor-regenerator system wherein catalyst is returned to the regenerator in an annular conduit around the air inlet line, and Figure 2 is a vertical section through my system wherein the catalyst return conduit leads to the upper part of the regenerator.

As a specific example of my invention I will describe a 20,000 barrel per day catalytic cracking unit for producing motor fuel from conventional gas oil charging stocks. It should be understood, however, that my invention is not limited to catalytic cracking but is applicable to a wide variety of other conversion process such as catalytic reforming, isomerization, hydrogenation, dehydrogenation, aromatization, desulfurization, etc. My invention is also applicable to catalytic processes generally such as oxidation, reduction, chlorination, etc. and it is even applicable to processes where no chemical conversion is effected such, for example, as processes of adsorption and desorption.

Referring to Figure 1, tower 10 contains reaction zone and regeneration zone with separation zones for the catalyst within each of these zones and with an internal stripping zone within the reaction zone. In operation, about 20,000 barrels per day of gas oil is charged from source 11 through heater 12 and transfer line 13 to reaction zone 14 in the lower part of tower 10. The heating zone may be a conventional pipe still but it is preferably a simple heat exchanger or plurality of heat exchangers and if the charging stock is not completely vaporized in the heater 12 it is quickly and almost instantaneously vaporized on its discharge from distributor 15 into the reaction zone. The heat necessary for effecting the catalytic cracking is supplied by the hot catalyst from the regeneration zone since there is usually enough carbonaceous deposit on the catalyst to supply the necessary amount of heat. By recycling large quantities of catalyst the catalyst itself acts as a heat carrier and if desired an inert heat carrier material may be admixed with the catalyst. The temperature in the reaction zone is preferably within the approximate range of 800 to 1050° F., e. g. about 900° F. The pressure in the upper part of the reactor zone may be about 8 pounds per square inch and at the base thereof may be about 10 to 12 pounds per square inch depending on the depth of the dense catalyst phase therein.

The catalyst itself may be of the silica-alumina or silica-magnesia type. Such a catalyst may be prepared by the acid treating of natural clays such as bentonite or montmorillonite or by incorporating a metal oxide such as alumina, magnesia, thoria, zirconia, etc. with activated silica. One method of preparing a catalyst is by ball-milling silica hydrogel with alumina or magnesia using about 2 to 30% of alumina or magnesia. The ball-milled dough may be dried at about 240° F. and then activated by heating to a temperature of about 900 to 1000° F. No invention is claimed in the composition or preparation of the catalyst per se and it is therefore unnecessary to describe the catalyst in further detail.

The catalyst may be in powdered form or in the form of small spherical particles with a particle size of about 10 to 100 microns. The invention is applicable, however, to other catalyst sizes, i. e. up to 200 microns or even to 10 or 20 mesh screen size, provided only that the catalyst be of such size and density that it may be aerated and handled as a fluid in the manner herein described. The superficial vertical gas or vapor velocity in the reactor and regenerator for this finely divided catalyst should usually be within the approximate range of 1 to 2½ or 3 feet per second but with some catalysts it may be as low as .5 and with others it may be as high as 5 feet per second. With vertical gas velocities in this particular range, i. e. of about 1½ feet per second, the catalyst is maintained as a suspended turbulent dense phase which is superimposed by a light diluate phase. The density of the dense phase should be within the approximate range of .3 to .9 or within the more limited range of .5 to .6 times the bulk density of settled catalyst and in this particular case the bulk density of the dense catalyst phase may be within the approximate range of 10 to 25 or 30 pounds per cubic foot, usually about 18 to 20 pounds per cubic foot. The light dilute phase on the other hand is of very low density, usually below 1 pound per cubic foot although in that portion of the dilute phase immediately above the dense phase the bulk density may be as high as 5 pounds per cubic foot. The aerated catalyst in standpipes is usually even more dense than the dense phase catalyst in the contacting zones and sufficient aeration gas should be injected to maintain this catalyst in aerated liquid-like condition and at desired density.

Tower 10 is a cylindrical vessel about 36 feet in diameter with a cylindrical wall height of about 60 feet. Its inclined bottom walls 16 lead to a smaller cylindrical section 17 about 15 feet in diameter which section extends downwardly to a level about 25 feet below the top of inclined wall 16. Cylindrical section 17 has an upwardly extending portion 18 extending to a level about 5 to 10 feet above the bottom of the outer cylindrical walls (i. e. about 5 to 10 feet above the top of inclined wall 16). Conversion is effected by suspended turbulent dense phase catalyst above bottom wall 16 and between cylindrical section 18 and the outer walls of the tower.

The bottom walls 19 of smaller cylindrical section 17 slope downwardly toward air inlet pipe 20 and an expansion joint 21 provides for vertical movement of said pipe with respect to bottom walls 19. To prevent catalyst solids from entering the expansion joint I may provide seal rings 21a and I may introduce steam or other gas through line 21b in such amounts and at such pressure that it will continuously blow by the seal rings and thus prevent entry of catalyst solids. Pipe 20 may be about 3 feet in diameter and it may extend upwardly in tower 10 to a level about 45 feet from the top of inclined walls 19 or about 20 feet above the top of inclined walls 16, although this particular height is not critical. At a level about 25 feet below the top of the outer cylindrical walls a funnel-shaped partition 22 is welded or otherwise secured to the outer walls of tower 10 the upper conical surface of this partition forming the bottom of the regeneration zone and the top of the conversion zone. The tubular bottom portion 22a of the funnel-like partition is about 7 feet in diameter and it extends downwardly around pipe 20 to a point below the level of the bottom of wall 17 but above the bottom walls 19. The space between cylindrical walls 18 and the walls of tube 22a constitutes the stripping zone in my system. The annular space between tube 22a and pipe 20 provides the conduit for returning catalyst from the stripping zone to the regeneration zone.

A standpipe 23 extends through and is supported by the upper conical walls of funnel-like partition 22 and communicates with the regeneration zone in the top of tower 10 above the level of distributor plate 24, this distributor being merely a suitably supported plate provided with spaced perforations through which an upwardly flowing stream may be introduced and uniformly distributed into the regeneration zone. The bottom of standpipe 23 extends to a point 2 or 3 feet above the juncture of walls 10 with inclined walls 16 or in other words it extends to a point below the level of the dense phase catalyst in the conversion zone. This standpipe may be about 3 or 4 feet in diameter and a plurality of such standpipes may be positioned at spaced intervals around the tower. Aeration gas may be introduced into the standpipe and the flow of catalyst from the standpipe may be regulated by suitable valves 25 which may be slide valves or valves of the type illustrated, for example, by valve 21 in U. S. Letters Patent 2,341,193.

Stripping steam is introduced to the system through line 26 and is distributed at the base of the stripping zone at a level above the bottom of tube 22a by distributor 27. Air from line 28 is compressed by compressor 29 to about 6 pounds per square inch and introduced into pipe 20. Aeration gas which may be air, steam or any inert gas may be introduced through line 30 in amounts controlled by valve 31 into one or more distributors 32 positioned at one or more levels in the catalyst return conduit, i. e. the space between tube 22a and pipe 20. The product gases and vapors are withdrawn through line 33 and regeneration gases are withdrawn through line 34. It should be understood that cyclone separation means may be employed in either the reaction zone or the regeneration zone or both as taught by U. S. Letters Patent 2,337,684.

In operation about 20,000 barrels per day or 253,500 pounds per hour of charging stock vapors along with about 8,000 or 9,000 pounds per hour of steam is introduced through distributor 15 at the base of the conversion zone and at substantially reaction temperature. The charge may be superheated if the heat introduced into the reactor with regenerated catalyst is insufficient to maintain the desired reaction temperature. Usually, however, the heat which is stored in the catalyst in the regenerator and which is given up by the catalyst in the reactor is more than enough to accomplish the desired conversion so that the temperature of the incoming charging stock stream may be correspondingly lower. I prefer to balance the heat of reaction with the heat of regeneration by varying the temperature of the incoming charging stock but it should be understood that cooling means may be employed in the regenerator or catalyst may be recycled from the regenerator to a cooler and thence back to the regenerator in manners now known to the art.

Hot regenerated catalyst at a temperature of about 1025° F. is introduced at the base of standpipe 23 into the reaction zone at the rate of about 3,800,000 pounds per hour. This catalyst is uniformly dispersed throughout the entire dense phase in the reaction zone and it supplies the heat of cracking while maintaining a reactor temperature of the order of about 900° F. As much as 4000 pounds per hour of aeration steam may be required for introduction through or above valve 25 but this amount may be much less and in fact may be negligible when the system is on stream.

Catalyst may be withdrawn from the reaction zone over the top of cylindrical walls 18, or through openings 18a spaced from the top of said walls, into the stripping zone at the same rate as catalyst is introduced into the reactor. The stripping zone may, in fact, be entirely below the reaction zone, i. e. walls 18 may be eliminated and the stripping effected between walls 17 and 22a, the distributors and dimensions being accordingly adjusted. About 10,000 to 12,000 pounds per hour of stripping steam may be introduced through line 26 and distributor 27. The vertical steam velocity in the stripping zone should be about 1 foot per second. Stripped catalyst flows downwardly below distributor 27 and upwardly in the return-catalyst conduit between tube 22a and pipe 20 as will be hereinafter described in further detail. Catalyst from the top of this conduit is picked up with about 152,500 pounds per hour or approximately 34,000 cubic feet per minute of air (measured at 60° F. and atmospheric pressure) which has been compressed in compressor 29 to a pressure of about 6 pounds per square inch. The air stream carries the catalyst from the top of the return conduit upwardly through distributor plate 24 and into the dense catalyst phase above the distributor plate. Regenerated catalyst is returned by standpipe 23 to the reaction zone and regeneration gases are withdrawn through line 34. The product stream withdrawn through line 33 is fractionated in any conventional manner and in this particular case may yield about 900 barrels per day of residual oil, about 4,999 barrels per day of heavy gas oil, about 4,900 barrels per day of light (35° F. A. P. I.) gas oil, about 9,000 barrels per day of 10 pound Reid vapor pressure gasoline and about 1,000 barrels per day of excess butanes and butylenes.

In the operation hereinabove described a pressure of about 3.4 pounds per square inch is maintained at the top of the regenerator and a suspended turbulent dense catalyst phase of about 9 or 10 feet in depth is maintained above the top of distributor plate 24. There is a pressure drop of about ½ pound across the distributor plate so that the pressure at the bottom of the distributor plate is about 5 pounds and immediately above the distributor plate is about 4.5 pounds per square inch. The pressure at the base of stand pipe 23 is about 10 pounds per square inch due to the added pressure head of the catalyst in the standpipes 23 and this pressure may be controlled by varying the rate of introducing aeration gases through valve 25 from source 25a. The pressure in the corresponding level in the reaction zone is only about 8 or 9 pounds per square inch, the reaction products leaving the reaction zone at a pressure of about 7 or 8 pounds per square inch.

Since there is little frictional pressure drop resulting from movement of the catalyst from the reactor 14 through the stripping section formed by walls 17 and 22a and the catalyst return conduit, i. e., the annulus formed by pipes 22a and 20, the pressure at the top of the above return conduit plus the static head of catalyst in the said return conduit will equal the pressure in the reactor plus the static head of catalyst in said stripping section. When the pressures at the top of the above conduit and in the reactor are held constant and the amount of stripping medium introduced through line 26 is also maintained constant, the catalyst level in the stripping section and therefore in the reactor depends upon the density of the catalyst in the return conduit. Since this density in the conduit depends upon the amount of aeration in the conduit, the catalyst level in the reactor can be controlled by the aeration in this conduit. When in balanced operation the columns of catalyst just balance each other under their respective pressures and any catalyst added to the reactor will cause an equal quantity of catalyst to be displaced at the top of the conduit. Thus the catalyst circulation rate is controlled by the rate of addition to the reactor 14, that is by the regenerated catalyst slide valve 25.

The amount of aeration gas introduced through line 30 will be dependent in large measure on the height and cross-sectional area of the catalyst-return conduit and in the specific example herein described it may be about 3000 to 5000 or about 4000 pounds per hour of aeration steam. When pipe 20 extends into pipe 22a only up to the approximate level of the dense catalyst phase in the reactor, less aeration gas will be required than when it extends to the top of pipe 22a. The latter arrangement, however, provides an added safety factor, i. e. a more effective seal. The cross-sectional area of the return conduit should be large enough to provide free flowing without excessive pressure drops. In the preferred embodiments, as illustrated by the specific example herein described, the return conduit simply and automatically maintains uniform catalyst hold-up in the reactor. If the rate of catalyst introduction through standpipe 23 is increased, the catalyst head in the reactor and stripper will be increased and a correspondingly increased amount of catalyst will flow through the return conduit. If catalyst flow through standpipe 23 decreases or stops, then flow through the return conduit will automatically decrease or stop because of the decreased head at the base of the stripper as compared with the head at the base of the return conduit. Valve 31 may be operated in accordance with the pressure differential from the bottom to the top of the return conduit and it may be operated manually or automatically by hydrostatic, pneumatic, mechanical or electrical means to maintain a substantially constant pressure at the base of the stripping zone or in other words a constant catalyst hold-up in the reactor-stripper vessel.

The embodiment illustrated in Figure 2 is identically the same as there hereinabove described in connection with Figure 1 except for a slight modification in the structure and arrangement of the catalyst return conduit. In this case the air inlet pipe 20 is directly connected to the cone-shaped bottom 22b of the regenerator and a return conduit 22c extends through and is supported by said sloping walls 22b. Conduit 22c may be integrally connected to or supported by pipe 20 in this modification and by the same token standpipe 23 may be adjacent, supported by, integrally associated with or even outside the outer wall of tower 10. The use of a cylindrical conduit 22c instead of an annular conduit simplifies to a certain extent the distribution of aeration gas into this conduit. Aeration gas distributor 32 may be a relatively small pipe extending axially upward almost to the top of conduit 22c and this small pipe may be provided with perforations at spaced intervals to provide the desired extent of aeration all along the conduit. Conduit 22c may terminate just above walls 22b or may communicate with pipe 20 at an even lower level and may thus function in exactly the same way as hereinabove described in connection with Figure 1. However, conduit 22c may have an upper extension 22d passing through distributor plate 24 and terminating at a point above the distributor and either adjacent thereto or at about the upper dense phase catalyst level in the regeneration zone. By thus returning the catalyst directly to the upper part of the regeneration zone I avoid the necessity of passing catalyst through distributor plate 24 and I thereby effect additional savings in compression costs, but considerably larger amounts of aeration gas will have to be introduced through line 30.

While I have described two specific embodiments of my invention it should be understood that my invention is not limited thereto since numerous other modifications and alternative operating conditions will be apparent to those skilled in the art from the above description. Catalyst from standpipe 23 may be suspended in charging stock vapors before being introduced into the reactor, and such introduction may be through a suitable distributor as disclosed in connection with the regenerator. Standpipe 23 may be outside instead of inside the unitary reactor-regenerator system. In some cases the reactor may be mounted above the regenerator, this being particularly desirable in such reactions as the dehydrogenation of normal butenes to produce butadiene where the reaction should be at as high a vacuum as is feasible but atmospheric pressure is employed for regeneration. These are merely illustrative of possible modifications of the invention.

I claim:

1. In apparatus suitable for effecting catalytic conversion of hydrocarbons with solid catalyst of small particle size, a vertical cylindrical conversion chamber having inclined bottom walls and top walls, a vertical cylindrical regeneration chamber superimposed above said conversion chamber the top walls of the conversion chamber forming at least a portion of the bottom walls of the regeneration chamber, a tube extending downwardly through the conversion chamber and communicating at its upper end with the inclined walls which form the base of the regeneration chamber, a cylindrical stripping chamber surrounding said tube with its upper end open to said conversion chamber and with its lower walls extending below the inclined walls of the conversion chamber, an expansion joint at the base of said stripping chamber, a compressed air pipe extending through said expansion joint and axially through at least a substantial part of said tube, the lower end of said tube being spaced from the bottom wall of said stripping chamber whereby fluidized solids may flow from the stripping chamber into an annular space between said tube and said pipe, said space forming a catalyst return conduit, means for introducing an aeration gas into said catalyst return conduit, means for regulating the amount of aeration gas so introduced, means for introducing steam at a low point in the stripping chamber at a level above the bottom of said tube, means for introducing compressed air into said pipe and for distributing said compressed air into the regeneration chamber along with catalyst from the top of said return conduit, a stand-pipe communicating at its upper end with said regeneration chamber, means for introducing catalyst from the base of said standpipe into said conversion chamber, means for removing regeneration gases from the upper part of said regeneration chamber and means for removing conversion products from the upper part of said conversion chamber.

2. In apparatus suitable for effecting catalytic conversion of hydrocarbons with solid catalyst of small particle size, a cylindrical contacting chamber provided with a conical base, a tube extending downwardly from said conical base, outer circular walls surrounding said tube and extending from said conical base to a low level below the lower end of the tube, an expansion joint at the bottom of said walls, an air pipe extending upwardly from said expansion joint and communicating with the space within said conical base above said tube, said pipe being of smaller diameter than said tube whereby an annular conduit is formed between said tube and said pipe, and means for introducing an aeration gas in regulated amounts into the annular space between said tube and said pipe.

3. In apparatus for effecting catalytic conversion with solid catalyst of small particle size, a reaction chamber, a regenerator superimposed above said reaction chamber with the bottom wall of the regenerator forming the top wall of the reaction chamber, a stripping chamber communicating with and at least partially surrounded by said reaction chamber and underneath said regenerator, a standpipe extending through said wall for conveying aerated catalyst from the regenerator to the reaction chamber, a substantially vertical conduit extending from a low point in the stripping chamber directly upward at least to said wall and merged in unrestricted communication with the lower part of the stripping chamber for conveying aerated catalyst from the bottom of the stripping chamber directly upward to said regenerator, means for introducing an aeration gas in regulated amounts into said conduit, means for introducing a stripping gas into said stripping chamber, means for introducing charging stock into said reaction vessel, means for removing reaction products therefrom, means for introducing compressed air at a low point in said regenerator, said last-named means comprising a vertical compressed-air line extending upwardly through at least a part of said reaction chamber and extending at least to said wall, means for distributing said air across substantially the entire cross-sectional area of said regenerator and means for removing gases from the top of said regenerator.

4. The apparatus of claim 3 wherein the upper end of said conduit is below said distributing means.

5. The apparatus of claim 3 wherein the upper end of said conduit terminates above the level of said distributing means.

6. In apparatus for effecting catalytic conversion with solid catalyst of small particle size, a reaction chamber, a regenerator superimposed above said reaction chamber with the bottom wall of the regenerator forming the top wall of the reaction chamber, a stripping chamber communicating with and extending below said reaction chamber, a standpipe extending through said wall for conveying aerated catalyst from the regenerator to the reaction chamber, a substantially vertical conduit extending from a low point in the stripping chamber directly upward at least to said wall and merged in unrestricted communication with the lower part of the stripping chamber for conveying aerated catalyst from the bottom of the stripping chamber directly upward to said regenerator, means for introducing an aeration gas in regulated amounts into said conduit, means for introducing a stripping gas into said stripping chamber, means for introducing charging stock into said reaction vessel, means for removing reaction products therefrom, means for introducing compressed air at a low point in said regenerator, said last-named means comprising a vertical compressed-air line extending upwardly through at least a part of said reactor chamber and extending at least to said wall means for distributing said air across substantially the entire cross-sectional area of said regenerator and means for removing gases from the top of said regenerator.

7. The apparatus of claim 6 wherein the upper end of said conduit is below said distributing means.

8. The apparatus of claim 6 wherein the upper end of said conduit terminates above the level of said distributing means.

9. In apparatus for effecting catalytic conversion with solid catalyst of small particle size a first contacting chamber, a second contacting chamber mounted above the level of the first contacting chamber, a distributor mounted at a low point in the second contacting chamber, a substantially vertical standpipe communicating with the space above said distributor in said second contacting chamber and extending downwardly for introducing catalyst solids at a low point in the first contacting chamber, means for regulating flow of solids in said standpipe and for maintaining solids therein in aerated condition, a substantially vertical pipe extending upwardly to the second contacting chamber and communicating therewith at a point below said distributor, a substantially vertical conduit with its lower end close to but spaced from the bottom of the first contacting chamber and with its upper end communicating with said second contacting chamber, means for introducing an aerating fluid in regulated amounts into said conduit, means for distributing a first fluid stream at a low point in the first contacting chamber and for removing a fluid stream from the upper part thereof, means for introducing a fluid stream into the second contacting chamber through said pipe and distributor, and means for removing a fluid stream from the upper part of said second contacting chamber.

10. The apparatus of claim 9 wherein said conduit communicates with the second contacting chamber at a point below said distributor.

11. The method of effecting catalytic conversion with a solid catalyst of small particle size which requires periodic regeneration, which method comprises introducing a regenerated catalyst from a downwardly moving aerated column thereof into a conversion zone which is underneath a regeneration zone, introducing a charging stock at a low point in said conversion zone and passing said charging stock as a gaseous stream upwardly through said conversion zone at such low velocity as to maintain a suspended turbulent dense catalyst phase therein superimposed by a light catalyst phase, withdrawing a product stream from said light dispersed catalyst phase, withdrawing catalyst from the dense phase in the conversion zone into an adjacent stripping zone and stripping the catalyst with a stripping gas in said stripping zone, conveying catalyst from a low level in the stripping zone directly upward to said regeneration zone as an upwardly moving aerated column, maintaining a pressure at the base of the stripping zone which is substantially higher than the pressure in the regeneration zone at the upper end of said column, introducing aeration gas into the upwardly moving column in such amounts that the average bulk density of the catalyst in the column multiplied by the length of the column gives a head sufficient to substantially balance the pressure difference between the base of the stripping zone and the regeneration zone at the upper end of the column so that by increasing aeration in the column upward catalyst flow is increased and by decreasing aeration in the column to a sufficient extent catalyst flow therein may be stopped, the extent of aeration thus serving the function of a regulating valve and the column without aeration serving the function of a cut-off valve, introducing a regeneration gas at a low point in the regeneration zone and passing said regeneration gas upwardly at such low velocity as to maintain a dense turbulent suspended catalyst phase superimposed by a light dilute catalyst phase, withdrawing regeneration gases from said dilute catalyst phase in the regeneration zone, withdrawing catalyst from the regeneration zone directly from the dense phase as a downwardly moving aerated column and returning catalyst from the base of said column to said conversion zone.

12. The method of claim 11 which includes the step of dispersing catalyst from the top of the upwardly moving column into the introduced generation gas before said regeneration gas is introduced into the regeneration zone.

13. The method of claim 11 which includes the step of introducing catalyst from the top of the upwardly moving column into the regeneration zone above the level at which regeneration gas is introduced thereto.

14. The method of claim 11 which includes the step of introducing aeration gas into the upwardly moving column at a plurality of spaced levels therein.

ROBERT J. HENGSTEBECK.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,270,903 | Rudbach | Jan. 27, 1942 |
| 2,304,128 | Thomas | Dec. 8, 1942 |
| 2,337,684 | Scheineman | Dec. 28, 1943 |
| 2,341,193 | Scheineman | Feb. 18, 1944 |
| 2,353,731 | Kanhofer | July 18, 1944 |
| 2,356,697 | Rial | Aug. 22, 1944 |
| 2,433,726 | Angell | Dec. 30, 1947 |